UNITED STATES PATENT OFFICE.

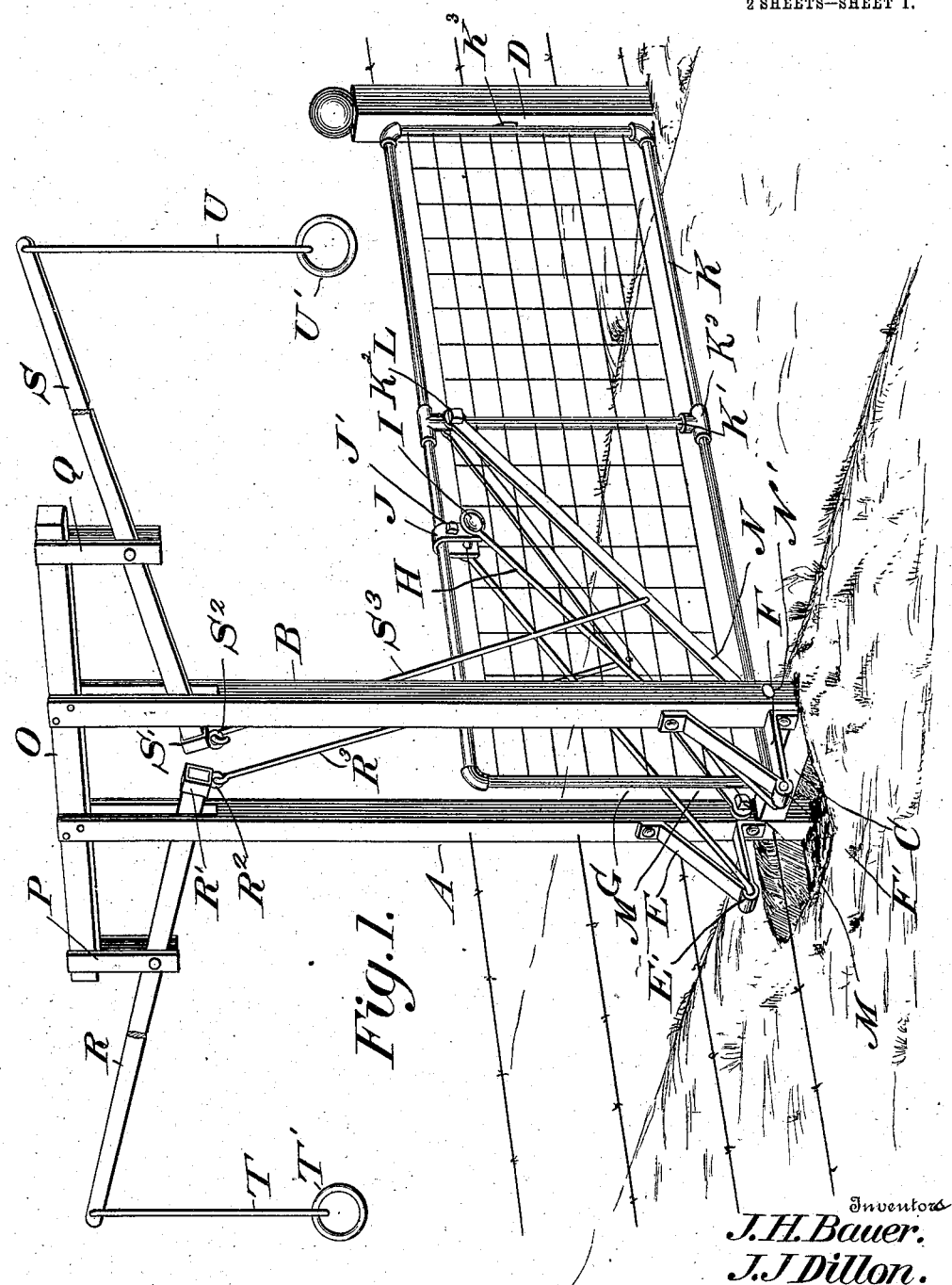

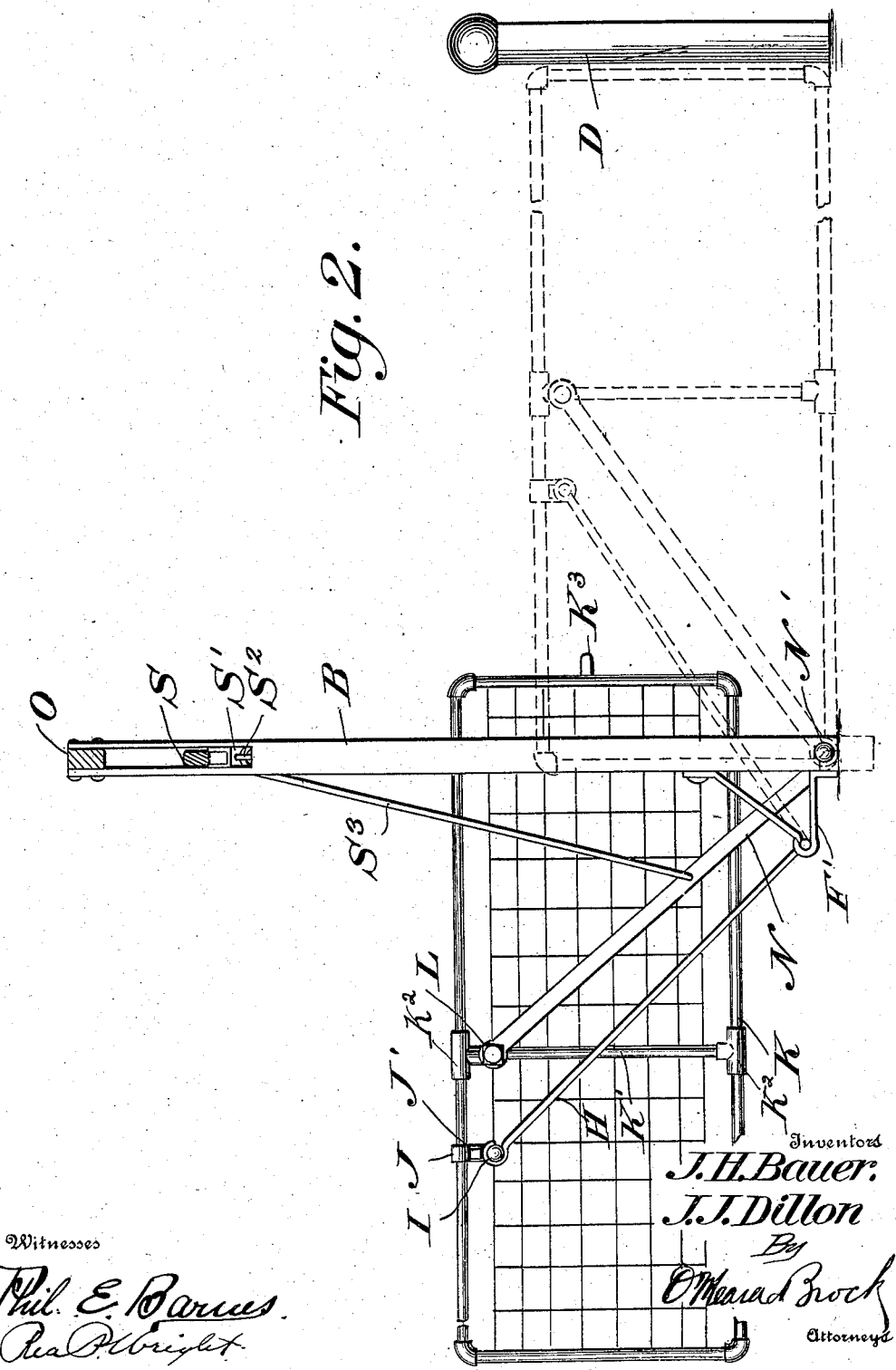

JOHN H. BAUER AND JOHN J. DILLON, OF STANBERRY, MISSOURI.

GATE.

No. 881,532.  Specification of Letters Patent.  Patented March 10, 1908.

Application filed May 8, 1907. Serial No. 372,507.

*To all whom it may concern:*

Be it known that we, JOHN H. BAUER and JOHN J. DILLON, citizens of the United States, residing at Stanberry, in the county of Gentry and State of Missouri, have invented a new and useful Improvement in a Gate, of which the following is a specification.

This invention relates to gates, and more particularly to jump gates; the object being to provide a gate which is very simple and cheap in construction and one which can be operated from either side of the gate with very little effort.

With this and various other objects in view, the invention consists in the novel features of construction, combination and arrangement of the parts, hereinafter fully described and pointed out in the claims.

In the drawings forming a part of this specification Figure 1 is a perspective view of my improved gate. Fig. 2 is a side elevational view of the gate, partly opened.

Referring to the drawings A and B indicate a pair of posts connected together by a bar C, arranged to one side of the frame adjacent the gate opening, and D the gate post arranged on the opposite side of the openings.

Secured to the rear of the posts A and B are brackets E and F provided with bearing sleeves $E'$, $F'$ in which are mounted the angled ends of rods G and H, provided with eyes at their upper ends which are mounted on the ends of a bolt I extending through a U shaped clip J secured on the top bar of the metal gate frame K, by a bolt $J'$. The frame K is provided with a central bar $K'$ secured to T-couplings $K^2$ carried by the top and bottom bars of the gate, and is covered with wire netting, but it is of course understood that any form of gate can be used with the same results. A bolt L is secured in the upper T-coupling of the central bar $K'$ on the ends of which are mounted the apertured upper ends of flat bars M and N which are pivotally mounted on bolts $M'$, $N'$ secured in the posts A and B adjacent the ground.

The upper ends of the posts A and B are slotted in which is secured a cross beam O carrying brackets P and Q at its ends, in which are pivotally mounted levers R and S, which extend through the slots of the posts A and B and have sleeves $R'$, $S'$ secured on their ends, provided with eyes $R^2$ $S^2$ carrying links $R^3$ $S^3$ the lower angled ends of which are pivotally mounted in openings formed in the flat bars M and N, so that when the ends of the levers are raised the gate will be lifted up and moved back from across the gate opening. The end bar of the gate is provided with a latch $K^3$ adapted to fit in a recess formed in the post D and securely lock the gate in place.

Cables T and U are secured to the end of the levers R and S, carrying rings $T'$, $U'$ by means of which the levers are pulled down so as to operate the gate.

From the foregoing description it will be readily seen that we have provided a very novel gate which can be easily and quickly operated for either side, and one which can be readily operated in deep snow, thereby overcoming the difficulties now existing with farm-gates.

Having thus fully described our invention, what we claim as new and desire to secure by Letters Patent is:—

1. In a gate, the combination with a pair of spaced posts connected together at their lower ends by a bar, and provided with slotted upper ends, of brackets secured to the rear of said posts adjacent the ground provided with bearing sleeves, rods provided with angled lower ends mounted in said bearing sleeves and provided with eyes at their upper ends, a pair of flat bars pivotally mounted on the inside face of said posts carrying a gate at the upper ends, a U-shaped clip secured on the top bar of said gate provided with outwardly extending bolts, the eyes of said rod being mounted on said bolts, a cross beam secured in the upper ends of said posts and carried by said cross-beam provided with links pivotally connected to the pair of flat bars.

2. In a gate, the combination with a pair of posts, provided with slotted upper ends, of a beam secured in said posts carrying brackets at its ends, levers mounted in said brackets carrying cables at their free ends, sleeves secured on the other end of said levers provided with eyes, brackets provided with bearing sleeves secured to the rear of the said posts, rods mounted in said sleeves connected to a U-shaped clip secured over the top bar of a gate, flat bars pivotally mounted on bolts secured to said post having their ends pivotally mounted on a bolt secured in the central bar of the gate, and links carried by the eyes of the sleeves secured on the levers connected to said bars, for the purpose described.

JOHN H. BAUER.
JOHN J. DILLON.

Witnesses:
JOHN L. KEMNELL,
W. H. LEMLEY.